United States Patent Office 3,116,262
Patented Dec. 31, 1963

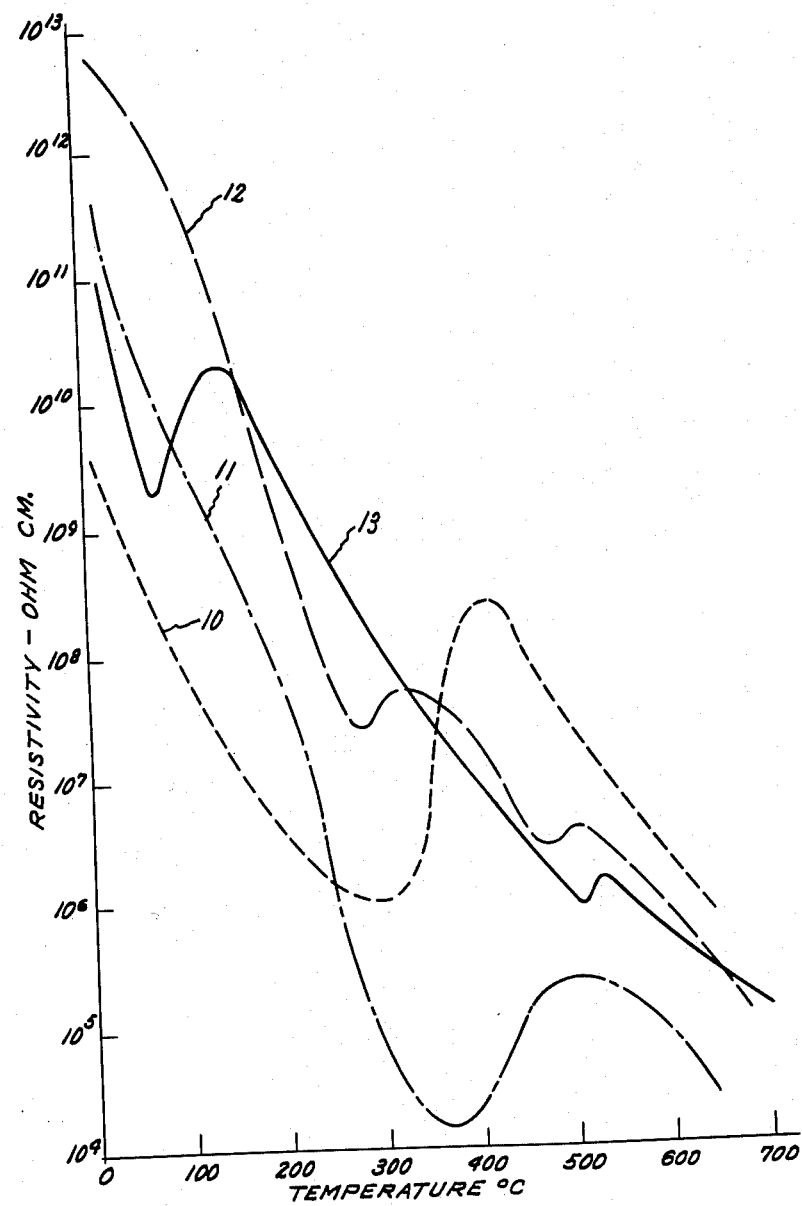

3,116,262
CERAMIC COMPOSITION
Gilbert Goodman, Schenectady, N.Y., assignor to General
Electric Company, a corporation of New York
Filed May 19, 1961, Ser. No. 111,278
9 Claims. (Cl. 252—519)

This invention relates to semiconducting ceramic compositions and more particularly to ceramic compositions having positive temperature coefficients of resistivity at elevated temperatures.

Semiconducting ceramics having large changes in electrical resistance with respect to increase in temperature are generally known as thermistors and have been used rather widely in recent years in temperature measurement and control devices. Thermistors, however, have inherent shortcomings which substantially restrict their value and utility and a demand for some means free from these drawbacks has, accordingly, been generally recognized for some time. Thus, it has been known that the problem would be alleviated through the provision of resistors having temperature coefficients of resistivity greater than usually provided by thermistors, and also by resistors having a positive temperature coefficient of resistance corresponding generally in magnitude and in temperature range to the negative temperature coefficient of resistance of the various thermistors. Efforts to obtain ceramics having a positive temperature coefficient of resistance have been of limited success, principally in obtaining materials which would be effective at relatively low temperatures. However, until the advent of the present invention, positive temperature coefficient resistors which are effective at elevated temperatures have not been found.

It is, accordingly, a principal object of this invention to provide a novel ceramic composition having a positive temperature coefficient of resistance effective for use at elevated temperatures.

Another object of this invention is to provide a fired ceramic composition consisting principally of lead metaniobate containing an alkaline earth metal and also containing small amounts of doping ingredients, giving the ceramic positive temperature coefficient of resistance at elevated temperatures.

A further object of this invention is to provide a novel electrical resistor having a positive temperature coefficient of resistance at elevated temperatures.

Other objects and advantages of this invention will be in part obvious and in part explained by reference to the accompanying specification and drawings.

In the drawings:

FIGURE 1 is a graph showing the resistivity of ceramics according to the present invention as a function of temperature.

Generally, the ceramic compositions of the present invention consist of fired combinations of metal oxides in such proportions that the composition is indicated by one of the formulas from the group:

(a) $(Pb_{1-x} \cdot A_x)(Fe)_y(Nb)_{2-y}(O_6)$
(b) $(Pb_{1-x} \cdot A_x)(W)_y(Nb)_{2-y}(O_6)$ and (c) $(Pb_{1-x} \cdot A_x)_{1-y}(La)_y(Nb_2O_6)$ In the formulas, A represents an alkaline earth metal from the group strontium, calcium, barium, and magnesium and $x$ has a maximum value of 0.85 and $y$ is generally a value of from about 0.001 to 0.06.

The basic ceramic material of this invention has the type-form equation, $AB_2O_6$, in which the A ions are principally lead, which appears in group IV of the periodic table, and the B ions are principally niobium. While lead metaniobate constitutes the basic ceramic material, lead-alkaline earth metaniobates containing an alkaline earth metal from the group consisting of strontium, barium, calcium and magnesium are also contemplated. The general formula of this type of ceramic is $$Pb_x \cdot A_{1-x} \cdot Nb_2O_6$$

where A represents one of the alkaline earth metals. It has now been found that suitable additions can be added to lead metaniobate or lead-alkaline earth niobate which will render the ceramic semiconducting. Specifically, minor amounts of doping materials, iron, lanthanum and tungsten, can be added to the basic niobate compositions in place of commensurate amounts of either niobium, lead or lead-alkaline earth combinations. The manner in which the doping substance, that is, the iron, lanthanum or tungsten, is added is a function of the ionic radius of the material, as is well known. Ideally, the doping ingredient should have an ionic radius closely similar to that of the material which it is replacing, but it should also have a different valence to bring about the desired interaction. Thus, on the basis of the ionic radii, iron and tungsten will replace some proportion of the niobium in the basic compound, while lanthanum will replace the lead, or lead alkaline earth portion of the compound.

Considering the composition of this invention more specifically, it was indicated that the basic composition was essentially a lead metaniobate to which various additions have been made. The first addition which can be made if desired is the alkaline earth metal, the general formula following the addition of the alkaline earth metal being: $(Pb_{1-x} \cdot A_x)Nb_2O_6$. In this formula, A represents an element selected from the group consisting of magnesium, calcium, barium, and strontium and mixtures thereof. As indicated, portions of the lead content of the ceramic lead metaniobate are replaced on a molar basis by equivalent quantities of one of the alkaline earth metals. The immediate effect of such substitution is a lowering of the curie temperature of the lead metaniobate from the vicinity of 570° C. It is believed that this lowering of the Curie point is the result of a distortion of the lead metaniobate crystal lattice by the substitution of ions differing slightly from lead ions in size and polarizability. The properties of the lead metaniobate and lead metaniobate containing the alkaline earth materials are set forth in Table I, following:

Table I

| Composition | Curie Temp., ° C. | $d^*$ | $k'^{**}$ |
|---|---|---|---|
| $Pb(NbO_3)_2$ | 570 | 5.0 | ~350 |
| $(Pb_{0.95} \cdot Ba_{0.05})(NbO_3)_2$ | 530 | 12.9 | 184 |
| $(Pb_{0.90} \cdot Ba_{0.10})(NbO_3)_2$ | 500 | | 163 |
| $(Pb_{0.85} \cdot Ba_{0.15})(NbO_3)_2$ | 465 | | 210 |
| $(Pb_{0.80} \cdot Ba_{0.20})(NbO_3)_2$ | 415 | | 186 |
| $(Pb_{0.75} \cdot Ba_{0.25})(NbO_3)_2$ | 375 | | 350 |
| $(Pb_{0.50} \cdot Ba_{0.50})(NbO_3)_2$ | 375 | | 190 |
| $(Pb_{0.80} \cdot Sr_{0.20})(NbO_3)_2$ | 475 | 3.2 | 565 |
| $(Pb_{0.65} \cdot Sr_{0.35})(NbO_3)_2$ | 370 | 16.1 | 825 |
| $(Pb_{0.55} \cdot Sr_{0.45})(NbO_3)_2$ | 257 | 0.3 | 1,250 |
| $(Pb_{0.50} \cdot Sr_{0.50})(NbO_3)_2$ | 165 | 18.3 | 2,900 |
| $(Pb_{0.45} \cdot Sr_{0.55})(NbO_3)_2$ | 127 | 8.4 | 3,200 |
| $(Pb_{0.40} \cdot Sr_{0.60})(NbO_3)_2$ | 105 | 1.0 | 2,050 |
| $(Pb_{0.90} \cdot Ca_{0.10})(NbO_3)_2$ | 510 | | 680 |
| $(Pb_{0.85} \cdot Ca_{0.15})(NbO_3)_2$ | 460 | 5.7 | 280 |
| $(Pb_{0.75} \cdot Ca_{0.25})(NbO_3)_2$ | 403 | 6.3 | 410 |
| $(Pb_{0.70} \cdot Ca_{0.30})(NbO_3)_2$ | 404 | 3.9 | 310 |
| $(Pb_{0.90} \cdot Mg_{0.10})(NbO_3)_2$ | 552 | | 150 |
| $(Pb_{0.50} \cdot Mg_{0.50})(NbO_3)_2$ | 550 | | 100 |
| $(Pb_{0.85} \cdot Ba_{0.01} \cdot Sr_{0.01})(NbO_3)_2$ | 469 | 6.5 | 270 |
| $(Pb_{0.85} \cdot Ba_{0.01} \cdot Sr_{0.11})(NbO_3)_2$ | 487 | 6.9 | 270 |
| $(Pb_{0.50} \cdot Ba_{0.375} \cdot Sr_{0.125})(NbO_3)_2$ | 222 | 14.7 | 1,830 |

*$d_{33}$ Piezoelectric constant $\times 10^{-11}$, coulombs per newton.
**Room temperature dielectric constant, measuring frequency, 1 mc./sec.

The alkaline earth metals can be substituted in amounts of up to about 0.85 mol percent or can be completely omitted if desired. However, when substituted, the amounts, in mol percentages, can range from 0.001 to 0.85 for strontium, 0.001 to 0.85 for calcium, 0.001 to 0.85 for barium, and 0.001 to 0.85 for magnesium. Preferred ranges are: strontium, 0.001 to 0.60; calcium, 0.01 to 0.025; barium, 0.001 to 0.40; and magnesium, 0.001 to 0.10 weight percent. As already mentioned, the alkaline earth metals can be completely omitted or can be added singly or in combination.

Turning now to a discussion of the additions with which the present invention is particularly concerned, specifically the iron, lanthanum and tungsten controlled valence additions which render the material semiconductive, it has been found that these elements can be substituted in amounts of from 0.001 to as much as 0.06 mol percent to obtain the desired results. Iron which has a valence of 3+ and an ionic radius of 0.67 A. normally replaces $Nb^{5+}$, which has an ionic radius of 0.69 A. On the other hand, lanthanum valence 3+ has an ionic radius of 1.15 A. and replaces lead, which has a valence of 2+ and an ionic radius of 1.21 A.

Curve 10 of FIGURE 1 of the drawings illustrates the resistivity of lead metaniobate in which 0.05 mol part tungsten replaced a similar amount of niobium. In this instance, the temperature coefficient of resistivity was positive from about 300° C. to 425° C., the average increase per degree C. being on the order of 12.5 percent within this temperature range. This compound is represented by the formula

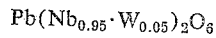
$$Pb(Nb_{0.95} \cdot W_{0.05})_2 O_6$$

Curve 11 of FIGURE 1 shows the properties of lead metaniobate in which 0.45 mol part strontium replaced that amount of the lead and tungsten, in the amount of 0.05 mol part, replaced a similar amount of niobium. In this instance, the formula is:

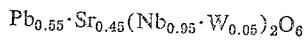
$$Pb_{0.55} \cdot Sr_{0.45}(Nb_{0.95} \cdot W_{0.05})_2 O_6$$

The temperature coefficient of resistivity is positive from a temperature of about 360° C. to 510° C., the average increase being on the order of 3.5 percent per degree C.

Another composition which was tested is one in which strontium and lead were combined and in which lanthanum then replaced part of the lead-strontium combination. The formula for this compound, the properties of which are indicated by curve 12 in FIGURE 1, is:

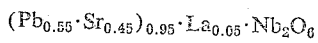
$$(Pb_{0.55} \cdot Sr_{0.45})_{0.95} \cdot La_{0.05} \cdot Nb_2 O_6$$

This compound was rather unusual in its resistance characteristics since there are positive temperature coefficient regions in the vicinities of 300° C. and 500° C.

An additional compound which was prepared and measured is one having the formula:

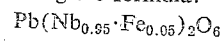
$$Pb(Nb_{0.95} \cdot Fe_{0.05})_2 O_6$$

Curve 13 of the drawing illustrates the properties of this material. It will be noted that lead alone was used rather than any combination of lead with one of the alkaline earth metals. In this case, the positive temperature effect took place from between about 500° C. to 530° C.

The raw materials used in making these ceramics are preferably reagent grade lead sulfate, high-purity niobium pentoxide, and reagent grades of barium oxalate, strontium carbonate, calcium carbonate, magnesium carbonate, and reagent grade oxides of iron, lanthanum and tungsten.

The raw materials are prepared for firing in accordance with the usual ceramic techniques. The materials are first mixed together in a liquid such as acetone or amylacetate, in which the materials are not soluble. The mixture is then dried and crushed into a fine powder so that the coarsest particles will pass a 200-mesh screen. The mixed oxide powder is then compacted into pellets for convenience in handling and the reaction between the constituent oxides accomplished by firing the pellets in an air furnace at about 1275° C. to 1300° C. for about one hour. The pellets of modified lead metaniobate are withdrawn from the furnace, cooled and recrushed to pass a 200-mesh screen. The resultant powder is then formed into the desired shape and refired. Small elements or bodies may be formed by dry pressing the powder under a pressure of about 10 tons per square inch.

The powder may also be admixed with a suitable binder or suspending agent such as, for example, a solution of polyvinyl alcohol and water or the like, and formed by pressing, extruding or casting. The water introduced with the binding agent may then be removed in any suitable fashion, for example, by heating the formed bodies at about 110° C. for several hours. The dry bodies are then fired in an air furnace. In order to prevent thermal stresses from causing physical damage to the formed bodies, it is preferred that the firing cycle start with the furnace at or near room temperature. The temperature is increased to about 1250° C. to 1400° C., depending on composition, over a period of about five to seven hours, held at about 1250° C. to 1400° C. for about one hour and then permitted to cool in the furnace back to room temperature. Obviously, the time necessary to fire these ceramic bodies will be dependent upon their size and shape. The ultimate firing temperature is important because little or insufficient sintering occurs below about 1250° C. and the compositions melt above about 1425° C.

The lead content is introduced as a sulfate to take advantage of the high (1000° C.) decomposition temperature of lead sulfate. However, lead oxide may also be used as the starting material. The materials added to modify the lead metaniobate, i.e., barium oxalate, strontium carbonate, calcium carbonate, and magnesium carbonate, all decompose at temperatures below 1000° C. to form their corresponding oxides. The lanthanum, iron and tungsten oxides are normally added in that form so that no decomposition is necessary. Most of the oxides are thereby made available in highly reactive states for interaction and combination. The rapid rise during the first firing temperature, together with a highly reactive state of the interacting oxides, produces a lead oxide-niobium pentoxide-modifying metal oxide interaction with little opportunity for lead loss by running off or vaporization of the molten lead oxide. Only about 1 to 2 percent of the theoretical lead oxide content is lost in the process. The firing is carried out in an oxidizing atmosphere, such as is provided by any air furnace, which prevents the reduction of the modified lead metaniobate which may occur if there is an insufficiency of oxygen present.

The electrical tests which were mentioned earlier in the specification and shown in the figure of the drawings were made on one-inch diameter ceramic test specimens that were metallized with either filament-evaporated silver or cathode-sputtered platinum. D.C. resistance measurements from room temperature to 700° C. were made with a General Radio #544-B megohm bridge for resistivities greater than $10^4$ and a Rohde and Schwarz resistance bridge, type BN340, for resistivities less than $10^4$ ohm-centimeters.

The specific examples set forth in the specification have been set forth as illustrative of the invention, it being understood that various modifications can be made within the true scope and spirit of the invention.

What I claim as new and desire to secure by Letters Patent of the United States is:

1. A semiconducting ceramic consisting essentially of a fired combination of metal oxides in such proportions that the composition has an approximate formula from the group consisting of:

(a) $(Pb_{1-x} \cdot A_x)(Fe)_y(Nb)_{2-y}(O_6)$ (b) $(Pb_{1-x} \cdot A_x)(W)_y(Nb)_{2-y}(O_6)$ and (c) $(Pb_{1-x} \cdot A_x)_{1-y}(La)_y(Nb_2 O_6)$ wherein A represents an alkaline earth metal from the group consisting of calcium, barium, strontium and magnesium, $x$ has a maximum value of 0.85 and $y$ has a value of from about 0.001 to 0.06.

2. A semiconducting ceramic consisting essentially of a fired combination of metal oxides in such proportions that the composition has an approximate formula from the group consisting of:

(a)         $(Pb_{1-x} \cdot A_x)(Fe)_y(Nb)_{2-y}(O_6)$
(b)         $(Pb_{1-x} \cdot A_x)(W)_y(Nb)_{2-y}(O_6)$
and
(c)         $(Pb_{1-x} \cdot A_x)_{1-y}(La)_y(Nb_2O_6)$ wherein A represents an alkaline earth metal from the group consisting of calcium, barium, strontium and magnesium, $x$ has a maximum value of 0.85 and $y$ has a value of from about 0.001 to 0.05.

3. A semiconducting ceramic consisting essentially of a fired combination of metal oxides in such proportions that the composition has the approximate formula:

$$(Pb_{1-x} \cdot Sr_x)(Fe)_y(Nb)_{2-y}(O_6)$$

wherein $x$ has a maximum value of 0.60 and $y$ has a value of from about 0.001 to 0.05.

4. A semiconducting ceramic consisting essentially of a fired combination of metal oxides in such proportions that the composition has the approximate formula:

$$(Pb_{1-x} \cdot Sr_x)(Fe)_y(Nb)_{2-y}(O_6)$$

wherein $x$ has a maximum value of 0.20 and $y$ has a value of from about 0.001 to 0.05.

5. A semiconducting ceramic consisting essentially of a fired combination of metal oxides in such proportions that the composition has the approximate formula:

$$(Pb_{0.55} \cdot Sr_{0.45})_{0.95}(La)_{0.05}(Nb_2O_6)$$

6. A semiconducting ceramic consisting essentially of a fired combination of metal oxides in such proportions that the composition has the approximate formula:

$$(Pb_{0.55} \cdot Sr_{0.45})(Nb_{0.95} \cdot W_{0.05})_2(O_6)$$

7. A semiconducting ceramic consisting essentially of a fired combination of metal oxides in such proportions that the composition has the approximate formula:

$$(Pb)(Nb_{0.95} \cdot W_{0.05})_2(O_6)$$

8. A semiconducting ceramic consisting essentially of a fired combination of metal oxides in such proportions that the composition has the approximate formula:

$$(Pb)(Nb_{0.95} \cdot Fe_{0.05})_2(O_6)$$

9. A semiconducting ceramic consisting essentially of a fired combination of metal oxides in such proportions that the composition has an approximate formula from the group consisting of:

(a)         $(Pb_{1-x} \cdot A_x)(Fe)_y(Nb)_{2-y}(O_6)$
(b)         $(Pb_{1-x} \cdot A_x)(W)_y(Nb)_{2-y}(O_6)$
and
(c)         $(Pb_{1-x} \cdot A_x)_{1-y}(La)_y(Nb_2O_6)$ wherein A represents an alkaline earth metal from the group consisting of calcium, barium, strontium and magnesium, $x$ has a value of from about 0.02 to 0.60 and $y$ has a value of from about 0.001 to 0.05.

References Cited in the file of this patent

UNITED STATES PATENTS 2,805,165      Goodman _____ Sept. 3, 1957

FOREIGN PATENTS 714,965      Great Britain _____ Sept. 8, 1954